INVENTOR.
SAMUEL D. GEHMAN
CLARENCE S. WILKINSON, JR.
BY R. L. Miller
ATTORNEY

Patented June 29, 1954

2,682,082

UNITED STATES PATENT OFFICE 2,682,082

METHOD OF VULCANIZING RUBBER

Samuel D. Gehman and Clarence S. Wilkinson, Jr., Akron, Ohio, assignors, by mesne assignments, to The Goodyear Tire & Rubber Company, a corporation of Ohio Application March 25, 1950, Serial No. 151,926

12 Claims. (Cl. 18—53)

This invention relates to the vulcanization of natural and synthetic rubber with the use of pressures much higher than those normally employed, and to means for carrying out the process.

Molding pressures of considerable magnitude are used in forming most rubber articles, but such pressures do not exert any appreciable effect on the course of the vulcanization reaction or the rate of cure. According to the present invention, natural or synthetic rubbers are vulcanized under pressures much higher than those normally employed. It has been found that these high pressures actually affect the course of the vulcanization and the rate at which it takes place. The properties of the vulcanized products are also affected in various respects, the particular changes depending in part upon the type of rubber and the compounding. Among the properties affected are resilience, dynamic modulus, electrical resistivity, and amount of combined sulfur. Some of the theoretical considerations and observed phenomena are set forth in JIEC 41, 841-846 (1949).

The invention is applicable to the production of a wide variety of rubber products, examples of which are gaskets, insulating material, torsional bushings, springs, and cushioning members.

One interesting phenomenon is that, although the rubber undergoes substantial volume compression at the high pressures used, the vulcanized products expand upon the release of the pressure so that the products have a volume and density comparable to those of products vulcanized at conventional pressures. Products vulcanized with conventional low pressures tend to develop strains due to thermal contraction after cure. By the use of the present invention, the volume compression during cure can be balanced against the thermal contraction after cure to produce a product substantially free from strain.

According to the practice of the invention, a vulcanizable rubber compound is vulcanized under a pressure of at least 50,000 pounds per square inch. More pronounced effects being produced by high pressures, a preferred practical range is from 100,000 to 200,000 pounds per square inch. Even higher pressures can be used. The usual vulcanizing agents, accelerators, and other compounding ingredients are used. The invention is particularly useful with a rubber stock having carbon black dispersed therein. The high pressure apparently prevents flocculation of the black during the vulcanization. The vulcanizing temperatures are in the usual range. The process can be employed with either natural or synthetic rubbers, and the term "a rubber" is used to include all such materials. Particularly notable effects have been observed with natural rubber and the copolymer of butadiene-1,3 and styrene, exemplified by the commercial product known as GRS.

One means for practicing the process of the invention is a mold capable of withstanding higher pressure, the body of which is provided with an opening extending therethrough, sealed plungers disposed in the cavity in opposed, spaced apart relation to one another to define a cavity in said opening to receive the material to be vulcanized. The plungers have projecting stems extending from their outer ends over which sealing disks are disposed in contact with the outer surface of the plungers surrounding the stems. Tubular spacers of greater length than the plunger stems are disposed over the stems and in contact with the sealing disks to transmit pressure to the plunger from pressure plugs in the ends of the mold opening which, in turn, receive pressure from pressure plates actuated by a platen press.

The practice of the invention is conveniently explained by reference to the accompanying drawing in which.

Figures 1, 2, 3, 4:
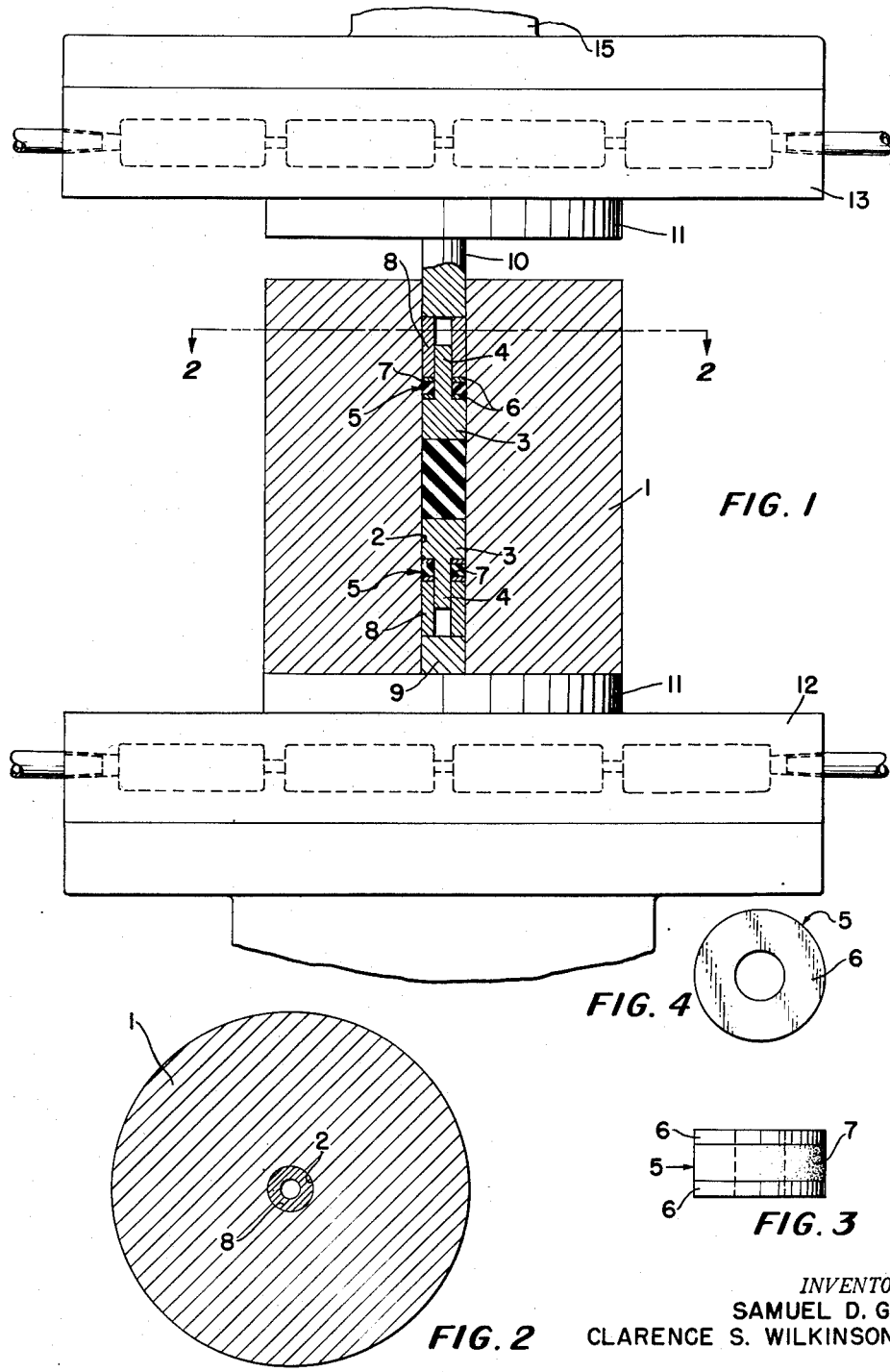
Figure 1 is a side sectional view of the mold positioned in a platen press.
Figure 2 is a sectional view of the mold taken on the line 2—2 of Figure 1.
Figure 3 is a side view of the sealing disks.
Figure 4 is an end view of the sealing disks.

Although the principles of the invention are broadly applicable to the molding of articles having various sizes and forms depending on the form and size of the mold opening and the plungers, both of which determine the capacity of the cavity and the shape of the molded articles whether they be circular, rectangular, oval, or otherwise. For the purpose of illustration applicants have chosen to describe the method and means for molding a cylindrical article.

With specific reference to the apparatus shown in the drawings, the mold body 1 is composed of an alloyed steel the proportions of which are sufficient to withstand the high pressure to which the cavity is subjected when molding an article. An opening 2 extends axially through the mold body to receive a pair of plungers 3 in opposed, spaced apart relation to one another, the space between the plungers defining a cavity in the opening of the mold. Extending axially from the outer ends of the plungers 3, stems 4 receive sealing disks generally indicated by the numeral 5 which are composed of a pair of metal disks 6 having a rubber or other deformable sealing material 7 positioned therebetween.

The sealing disks 5 are provided with openings through which the plunger stems 4 pass to permit the sealing disks 5 to rest upon the outer surface of each of the plungers surrounding the base of the stem. Also slidably mounted on the stems are tubular spacers 8 in contact with the sealing disks to exert pressure thereon. Pressure is exerted on the tubular spacers 8 by pressure plugs 9 and 10 disposed in the ends of the mold opening 2 to receive pressure from the pressure plates 11 which, in turn, receive pressure from steam heated platens 12 and 13 secured in a conventional platen press 14 actuated by a ram 15.

The lengths of the tubular spacers 8 are such that the stems 4 do not project entirely through the bores of the spacers preventing their ends from contacting the pressure plugs 9 and 10, thus creating free unsupported pressure areas of the plungers.

This arrangement provides a proportionately greater pressure in pounds per square inch on the sealing disks 5 than that transmitted to the greater area of the inner end surfaces of the plungers in contact with the article being vulcanized. The greater pressure on the sealing disks distorts the deformable sealing material 7 radially to form a seal to retain in the cavity the material being vulcanized.

In use, a plunger 3, sealing disk 5, spacer 8, and pressure plug 9 are positioned in the bottom of the opening 2 of the mold body 1 and the mold is placed on a pressure plate 11 which rests upon the lower steam heated platen 12. The rubber compound to be molded is then weighed or measured and placed in the mold opening to rest upon the inner surface of the plunger 3. In the upper end of the mold opening a plunger 2, sealing disk 5, spacer 8, and pressure plug 10 are inserted in the mold opening and a pressure plate 11 is disposed over the pressure plug to exert pressure thereon when actuated by the press platen 13. Heat is applied to raise the rubber to vulcanization temperature. After vulcanization the molded article is removed from the mold by an arbor press.

All the mold parts are composed of alloyed metal capable of withstanding the high pressure to which they are subjected.

While certain representative embodiments and details have been described and shown for the purpose of illustrating the invention, it will be apparent to those skilled in this art that various changes and modifications may be made therein without departing from the spirit or scope of the invention.

We claim:

1. The method which comprises vulcanizing a rubber under a pressure of at least 50,000 pounds per square inch.

2. A method of molding natural rubber which comprises vulcanizing it under a pressure of at least 50,000 pounds per square inch.

3. A method of molding a vulcanizable rubber-like copolymer of butadiene-1,3 and styrene which comprises vulcanizing it under a pressure of at least 50,000 pounds per square inch.

4. The method which comprises vulcanizing a rubber under a pressure of from 100,000 to 200,000 pounds per square inch.

5. The method which comprises heating to vulcanization temperature under a pressure between 100,000 and 200,000 pounds per square inch a rubber which has dispersed therein vulcanizing ingredients and carbon black.

6. A method of producing improved articles of rubber which comprises placing a measured amount of a vulcanizable rubber composition in a mold cavity, confining the rubber in said cavity, and subjecting the rubber to heat and a pressure of at least 50,000 pounds per square inch to vulcanize the rubber while retained under said pressure.

7. A method of molding rubber which comprises vulcanizing rubber having carbon black and vulcanizing ingredients dispersed therein under pressure sufficient to prevent flocculation of the carbon black during vulcanization.

8. A method of producing improved articles of rubber which comprises placing a measured amount of a vulcanizable rubber composition containing carbon black in a mold cavity, sealing said composition in the cavity and subjecting the composition to a pressure of at least 50,000 pounds per square inch while heated to a vulcanizing temperature.

9. The method of vulcanizing rubber articles comprising the steps of confining a measured quantity of a suitably compounded rubber in a space of variable size, and then reducing the size of said space while preventing the escape of the rubber until the pressure on the rubber is substantially at least 50,000 pounds per square inch and vulcanizing the rubber while it is under that pressure.

10. The method of vulcanizing rubber articles comprising the steps of confining a measured quantity of a suitably compounded rubber in a space of variable size, reducing the volumetric size of said quantity without loss of any of said compounded rubber until the pressure on the rubber is substantially at least 50,000 pounds per square inch and vulcanizing the rubber while it is held at that pressure.

11. The method of improving the physical characteristics of rubber comprising placing a measured amount of rubber composition having vulcanizing ingredients and carbon black dispersed therein in a mold cavity, sealing the cavity to retain the composition in said cavity and subjecting the composition to a vulcanizing temperature while under a pressure of at least 50,000 pounds per square inch to prevent flocculation of the ingredients therein.

12. The method of vulcanizing rubber to improve articles made therefrom which comprises confining a measured amount of a rubber composition containing vulcanizing ingredients and carbon black in a mold cavity, sealing the composition in said cavity, and subjecting the composition to a vulcanizing temperature while under a pressure of at least 50,000 pounds per square inch.

References Cited in the file of this patent

UNITED STATES PATENTS

| Number | Name | Date |
| --- | --- | --- |
| 909,487 | Wallace | Jan. 12, 1909 |
| 1,319,032 | Clark | Oct. 14, 1919 |
| 1,515,381 | Boyer | Nov. 11, 1924 |
| 1,541,336 | Ellis | June 9, 1925 |
| 1,992,170 | Burchett | Feb. 26, 1935 |
| 1,997,074 | Novotny | Apr. 9, 1935 |
| 2,083,676 | Vinal | June 15, 1937 |